United States Patent Office.

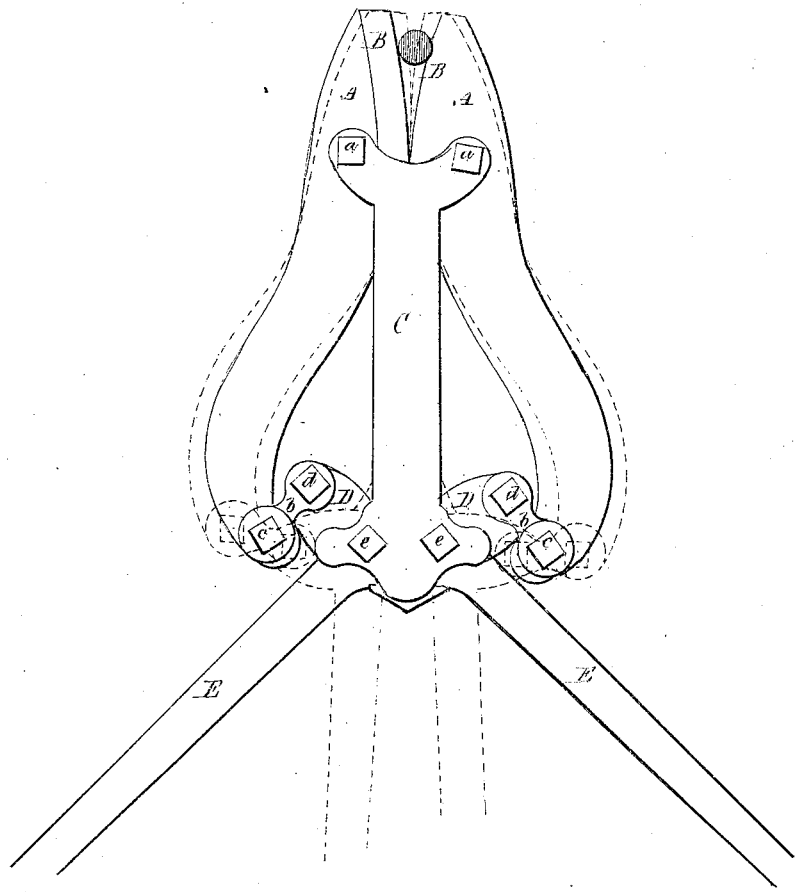

HIRAM L. HOWARD, OF MENDON, MICHIGAN.

Letters Patent No. 102,006, dated April 19, 1870.

IMPROVED BOLT-CUTTER.

The Schedule referred to in these Letters Patent and making part of the same.

*To whom it may concern:*

Be it known that I, HIRAM L. HOWARD, of Mendon, in the county of St. Joseph and State of Michigan, have invented a new and useful Improvement in Shears for Cutting Metallic Bolts; and I do declare that the following is a true and accurate description thereof, reference being had to the accompanying drawings and to the letters of reference marked thereon, and being a part of this specification.

The drawings represent my invention open and ready for use, with a section of an iron bolt inserted between the shear-blades; the red lines show the position of the various parts when closed.

The nature of this invention relates to the construction of an implement for cutting iron bolts and other metallic articles, and will be found especially adapted to the requirements of carriage-makers and blacksmiths in cutting off bolts and other similar work; and It consists in a pair of jaws provided with suitable cutting edges, operated by a series of compound levers, whereby an immense power is exerted upon the jaws to compel them to easily perform the work for which they are designed.

In the drawings—

A represents the jaws provided with suitable cutting edges, B.

C is a standard or frame, which may be made in two pieces, each similar to the other, one of each being placed on either side of the jaws, to which they are pivoted by means of the bolts $a$.

To the rear ends of the curved prolongations of the jaws are pivoted the solid links $b$, by means of the bolts $c$.

The opposite ends of the links are in turn pivoted to the ears B by means of the bolts $d$.

These ears form a part of the levers E, which are pivoted to the standard C by means of the bolts $e$.

A section of the head of these levers E is shown in a detached figure, by which it will be seen that their inner faces are semicircular, and provided with cogs, which engage with each other; that is, the cogs upon each head engage with the cogs upon the other, thereby compelling a like movement to each jaw.

The whole is so arranged that when the levers are extended, as in the drawing, the jaws are opened to receive the bolt to be operated upon.

By compelling the levers toward each other the jaws are forced together, cutting any substance that may be interposed between them.

What I claim as my invention, and desire to secure by Letters Patent, is—

The construction of an implement for the purpose described, wherein the jaws A, provided with cutting edges B, the standard or frame C, the ears D, levers E, links $b$, and bolts $a$, $c$, and $e$, are arranged substantially as herein set forth.

HIRAM L. HOWARD.

Witnesses:
  H. F. EBERTS,
  JAS. I. DAY.